(12) United States Patent
Lloyd (10) Patent No.: US 6,801,900 B1
(45) Date of Patent: Oct. 5, 2004

(54) SYSTEM AND METHOD FOR ONLINE DISPUTE RESOLUTION

(76) Inventor: Samuel H. Lloyd, 44 Crab Apple Pl., Stamford, CT (US) 06903

(*) Notice: Subject to any disclaimer, the term of this patent is extended or adjusted under 35 U.S.C. 154(b) by 0 days.

(21) Appl. No.: 09/470,415

(22) Filed: Dec. 22, 1999

(51) Int. Cl.[7] .............................................. G06F 17/60

(52) U.S. Cl. ................................ 705/10; 705/1; 705/12

(58) Field of Search ................................ 705/1, 10, 12

(56) References Cited

U.S. PATENT DOCUMENTS

| | | | |
|---|---|---|---|
| 6,240,415 B1 | * | 5/2001 | Blumberg |
| 6,250,548 B1 | * | 6/2001 | McClure et al. |
| 6,311,190 B1 | * | 10/2001 | Bayer et al. ............. 707/104.1 |
| 6,330,551 B1 | * | 12/2001 | Burchetta |
| 6,477,504 B1 | * | 11/2002 | Hamlin et al. ................ 705/10 |

FOREIGN PATENT DOCUMENTS

WO  WO 01/31589  *  5/2001

OTHER PUBLICATIONS

Courter, Gina and Marguis, Annette, Mastering Microsoft Office 2000 Professional Edition, Managing Data with Excel, Chapter 26, pp. 640–676, copyright date 1999.*

* cited by examiner

*Primary Examiner*—John G. Weiss
*Assistant Examiner*—Jan Mooneyham
(74) *Attorney, Agent, or Firm*—St. Onge Steward Johnston & Reens LLC (57) ABSTRACT

A system for performing dispute resolution comprising a computer, a communications link between the computer and the Internet and an active issue database, accessible by the computer, containing a plurality of issue files and corresponding voting forms. The system also includes issue presentation software executing on the computer for retrieving issue files and corresponding voting forms from the active issue database and presenting the issue files and corresponding voting forms to users over the communications link. The system further includes vote processing software executing on the computer for receiving the completed voting forms submitted by users over the communications link, updating the issue files in the active issue database to reflect the completed voting forms, and presenting vote tallies to users over the communications link.

14 Claims, 6 Drawing Sheets

SYSTEM AND METHOD FOR ONLINE DISPUTE RESOLUTION

FIELD OF THE INVENTION

The invention relates to a system and method for performing dispute resolution via the Internet.

BACKGROUND OF THE INVENTION

Dispute resolution is a method by which parties can resolve or settle their disagreements without the use of the court system or to facilitate and expedite the process when using the court system. There are many varieties of dispute resolution available to conflicting parties such as mediation and arbitration. The results of the dispute resolution can be, depending on the wishes of the parties, binding on the parties so as to avoid the need for future litigation on the same issues. Due to its limiting and often conclusive effect on claims, dispute resolution has become an integral part of the settlement of disputes and claims between parties over the years. It is often viewed as a preferable alternative to costly litigation or as a valued supplement to such litigation.

Traditionally, dispute resolution has been performed in offices and meeting rooms, with or without counsel present, and in the presence of at least one moderator who may or may not have the power to settle the dispute or determine issues. The variances being due in large part to the method of dispute resolution chosen by the parties. Often the formalities of motion practice and rules of evidence are suspended in an effort to ensure that all necessary information is presented in an expedited manner and that a fair determination of the issues is achieved. Despite its informal nature, though, dispute resolution generally requires a substantial amount of preparation and often necessitates the assistance and advice of legal counsel if the issues involved are complex. Due to this, it is often an unwieldy tool for the settlement of relatively small claims where the parties are adamant about their respective positions but would rather not spend too much time or money to make them.

Another disadvantage of traditional dispute resolution is that it tends to be geared toward resolving legal disputes involving legal arguments heard by legal decision-makers, such as judges and magistrates. These arguments and decision-makers may be of little or no value in resolving ethical, moral, and/or emotional disputes, though. Increasingly, disputes of these types are being resolved by a legal system that is ill-equipped to handle them, and often the resolution of such disputes prevents the courts from handling true legal questions, in a timely manner.

What is desired, therefore, is a system for performing dispute resolution that enables parties to present their issues to a customized decision maker and receive a determination in a short amount of time at a reasonable price. Providing such a dispute resolution system that operates over the Internet with interaction from Internet users is also desired.

SUMMARY OF THE INVENTION

Accordingly, it is an object of the invention to provide a system and method for performing dispute resolution via the Internet.

Another object of the invention is to provide a system and method for performing dispute resolution that allows users to submit issues, view active and closed issues, and vote on the best way to resolve active issues.

A further object of the invention is to provide a system and method for dispute resolution that allows users to submit issues for determination to only a select group of people having specific qualifications chosen by the user.

These and other objects of the invention are achieved by provision of a system and method for performing dispute resolution that operates over the Internet. The system comprises a computer, a communications link between the computer and the Internet and an active issue database, accessible by the computer, containing a plurality of issue files and corresponding voting forms. The system also includes issue presentation software executing on the computer for retrieving issue files and corresponding voting forms from the active issue database and presenting the issue files and corresponding voting forms to users over the communications link. The system further includes vote processing software executing on the computer for receiving the completed voting forms submitted by users over the communications link, updating the issue files in the active issue database to reflect the completed voting forms, and presenting vote tallies to users over the communications link.

Preferably, the system also includes software operating on a computer for authenticating and registering users of the system, receiving and processing issues submitted by users over the communications link, permitting users to search and select issues in the databases, and limiting voting on certain issues to user's who meet specified voting qualifications.

In another aspect, the invention comprises a method for performing dispute resolution over the Internet.

The invention and its particular features and advantages will become more apparent from the following detailed description considered with reference to the accompanying drawings.

DETAILED DESCRIPTION OF THE INVENTION

Figure 1:
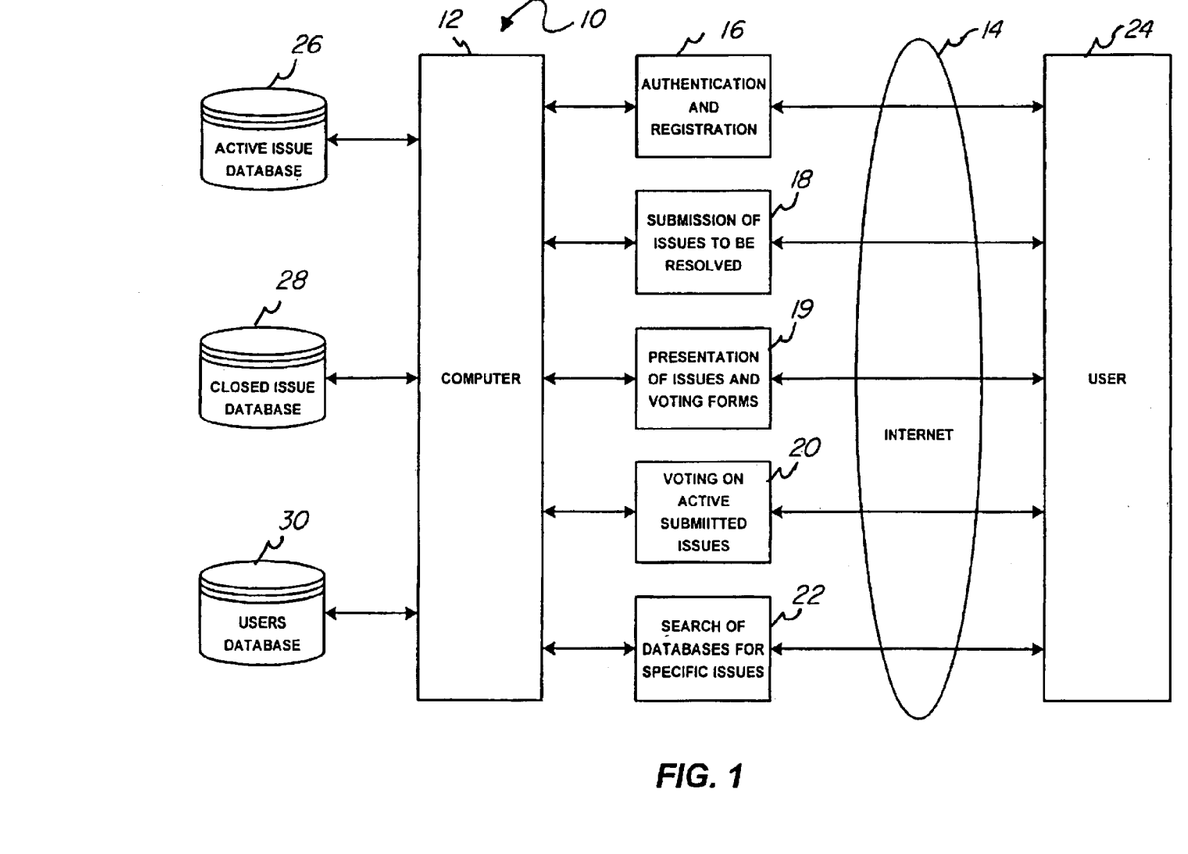
FIG. 1 is a schematic of a system for performing dispute resolution over the Internet in accordance with the invention.

FIG. 1 depicts a system 10 for performing dispute resolution over the Internet in accordance with the invention. The system 10 includes a computer 12 that is linked to the Internet 14 by a communications link (not shown) and software executing on the computer 12 for authenticating and registering 16 users 24 of the system 10, receiving and processing issues 18 submitted by users 24 of the system 10 over the communications link, presenting the issues and corresponding voting forms to users over the communications link, receiving and processing votes 20 from users 24 indicating their selection on the proper way to resolve an issue, and permitting users 24 to search the available databases 22 for specific issues sought by users 24. The system 10 further includes an active issue database 26, accessible by the computer 12, containing a plurality of issue files available to users for viewing and voting, a closed issue database 28, accessible by the computer 12, containing issue files available to users for viewing, and an users database 30, accessible by the computer 12, containing a plurality of user files containing user information and access codes. Preferably, the system 10 also includes software executing on said computer 12 for operating and maintaining an interactive Internet website for allowing communication between the computer 12 and users 24 over the communications link.

The system 10 includes registration software executing on the computer 12 for screening users 24 of the system 10. The authentication and registration: process 16 of the system 10 is shown in greater detail in FIG. 2. Once a user 241 accesses and enter 32 the system 10, such as by entering a specified website, using commercially available web browsing technology, the registration software determines if the user is registered or not 34. If the user is registered, the registration software transmits a log-in form 36 to the user 24 over the communications link that requests the user 24 to provide an individual access code. The user 24 then submits a completed log-in form 38 to the computer 12 indicating the user's access code. Upon receipt of the completed registration form 38, the registration software retrieves the user's access code 40 from the user's user profile in the users database 30 and compares the retrieved individual access code 40 to the submitted access code. If the codes do not match, the user is informed of such and the process is repeated until successful or aborted.

Figure 2:
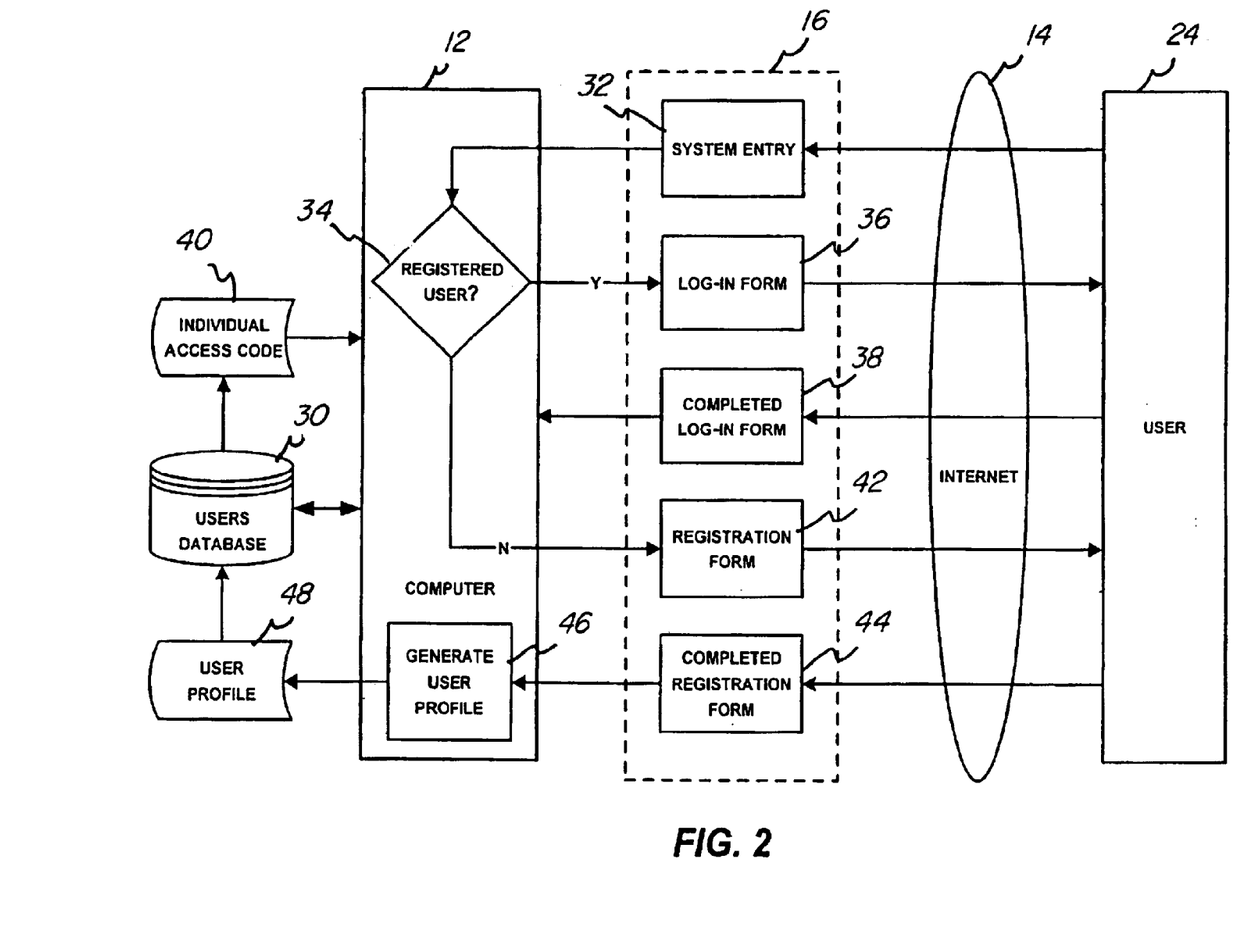
FIG. 2 is a schematic of the authentication and registration process of the dispute resolution system of FIG. 1.

If the registration software determines that the user is not a registered user, the registration software transmits a registration form 42 to the user 24 over the communications link. The registration form 42 requests pertinent information about the user 24 such as name, address, email address, age, gender, race, profession, education level, etc as well as requests the user 24 to choose an individual access code 40 for accessing the system 10. The user 24 completes the registration form 42 and submits the completed form 44 to the computer 12 over the communications link. The registration software receives the completed registration form 44, interprets the completed form 44 to generate a user profile 46 and stores the user profile 48 in the users database 30. The user profile 48 contains the information provided by the user 24 in the completed registration form 44 such as name, address, email address, age, gender, race, profession, education level, and the user's chosen individual access code 40 for accessing the system 10. Upon successful registration, the user 24 may freely use the system 10 upon submission of their individual access code 40 via the login form 36.

Figure 3:
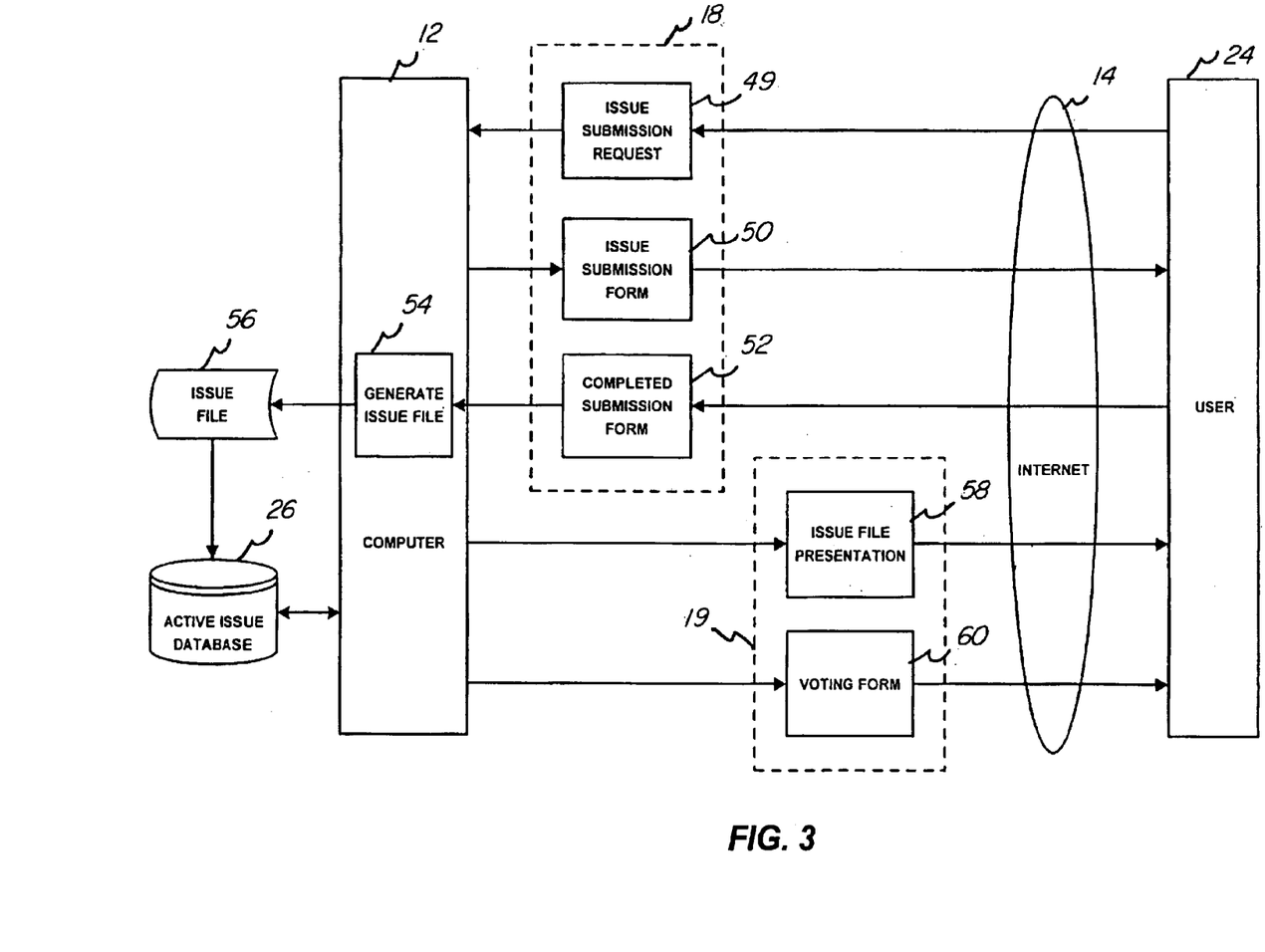
FIG. 3 is a schematic of the issue submission and issue presentation processes of the dispute resolution system of FIG. 1.

Once authenticated and registered, the user 24 may submit issues to be resolved to the system 10. FIG. 3 depicts a schematic of the issue submission, process 18 and the issue presentation process 19 of the system 10. Upon receipt of an issue submission request 49 submitted to the computer 12 by a user 24 over the communications link, issue submission software executing on said computer 12 transmits an issue submission form 50 to a user 24 with an issue needing to be resolved over the communications link. The issue submission form 50 requests pertinent information from the user 24 such as a brief statement of the issue to be resolved, a listing of possible outcomes or solutions, voter qualifications of users to vote on the issue, whether or not to accept comments from users, and how long voting should be open on the issue. The user 24 completes the issue submission form 50 by providing the requested information and submits the completed submission form 52 to the computer 12 over the communications link. The issue submission software receives the completed submission form 52, generates an issue file 54 based on the information provided by the user 24 in the completed submission form 52, and stores the issue file 56 in the active issues database 26.

Users may then peruse the issue file 56 in the active issues database, as also shown in FIG. 3. Issue presentation software executing on the computer retrieves the issue file 56 from the active issue database 26 and presents the issue file 58 along with a corresponding voting form 60 to all subsequent users of the system 10 for their review, for example by posting the issue on the website. The voting form 60 contains a listing of several pre-formulated possible solutions to the issue to be resolved for selection by subsequent users. The solutions may be the listing of possible solutions included by the submitter of the issue in the completed submission form 52 or may be derived by an external entity upon review of the issue file 56. The voting form 60 may also include a comment box for allowing users to submit individual comments on the issue being voted upon, if such is desired and indicated by the submitter of the issue in the completed submission form 52. Subsequent users of the system 10 may then peruse the issue file presentation 58 and corresponding voting form 60 along with any comments submitted by previous users who voted on the issue.

Figure 4:
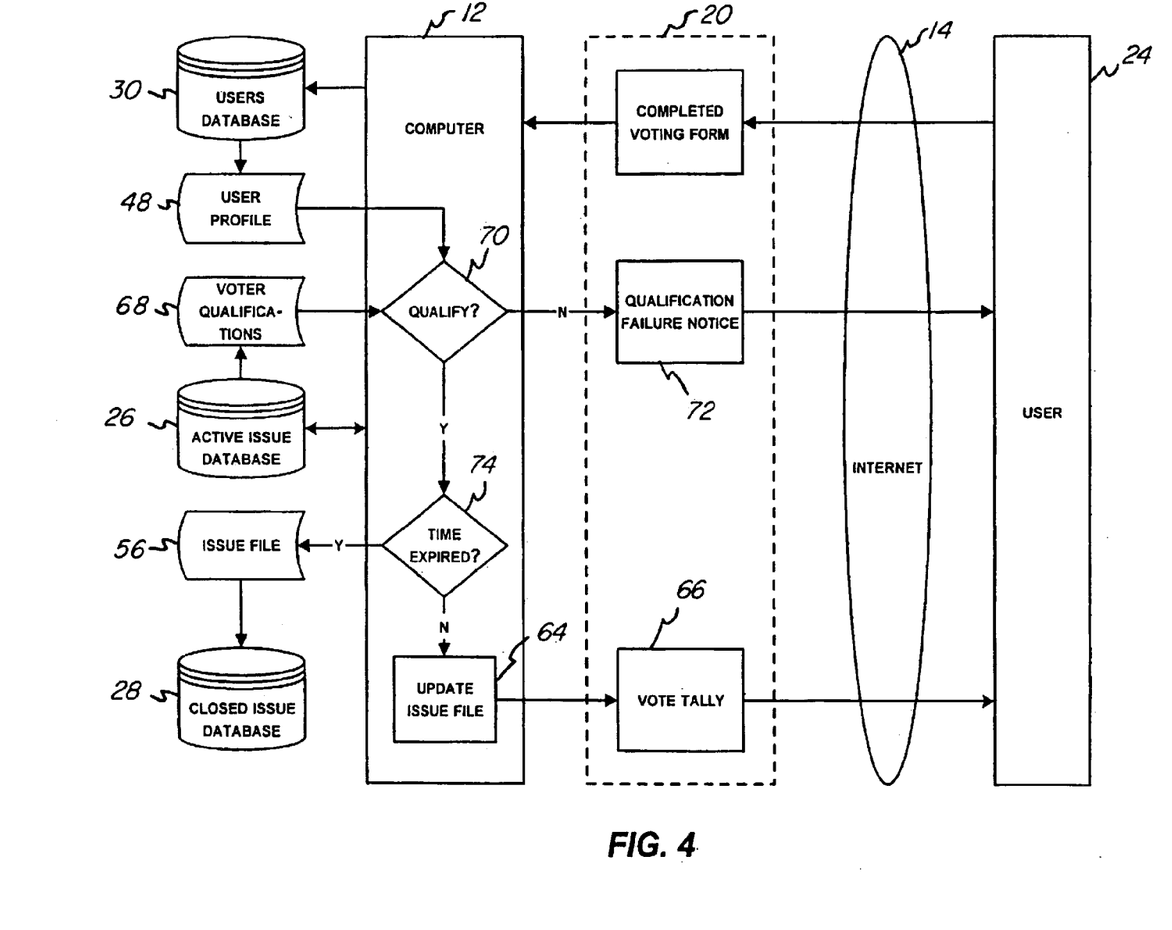
FIG. 4 is a schematic of the voting process of the dispute resolution system of FIG. 1.

FIG. 4 is a schematic of the voting process 20 of the system 10. Upon perusal of the issue file presentation 58 and voting form 60, users may then select a solution that they feel correctly settles the issue by completing the voting form 60 and submitting it to the computer 12 over the communications link. Vote processing software executing on said computer 12 receives the completed voting form 62, processes the completed voting form to determine the user's selection and any possible comments and updates the issue file 64 in the active issues database 26 (indicated by arrow connecting active issue database 26 with computer 12) to reflect the vote and comments, if any. The vote processing software then transmits the current vote tally 66 to the user 24 over the communications link, for example by posting the results on the website.

Preferably, the vote processing software can selectively control which users may vote on certain issues, as also shown in FIG. 4. Upon successful registration and entry to the system 10 and submission of a completed voting form 62, the vote processing software queries the issue file 56 in the active issues database 26 to determine if any voter qualifications 68 were specified by the submitter of the issue. The voter qualifications 68 may include various limitations on the users who may vote on an issue. The limitations may include any information requested in the registration form 42, such as age, gender, profession, etc. For example, the submitter of the issue may indicate that only women under the age of thirty-five or doctors from Chicago may vote on the issue. To determine if voter qualifications 68 are met, the vote processing software accesses the users database 30 to retrieve the voting user's user profile 48 and compares 70 the voting user's user profile 48 against any voter qualifications 68. If the voting user's user profile 48 meets the voter qualifications 68, the vote is processed and the issue file is updated 64 by the vote processing software. If not, the vote processing software transmits a qualification failure notice 72 to the user 24 over the communications link and the vote is disregarded In another embodiment, also shown in FIG. 4, voting on an issue may be limited to a certain time period defined by the submitter of the issue in the completed submission form 50. For example, the submitter of the issue may request that voting only be open for two weeks following submission of the issue. Upon receipt of a completed voting form 62, the vote processing software queries the issue file 56 in the active issues database 26 to determine the time period set by the submitter and whether the time period has expired 74. If the set time period has not expired, the issue file is updated to reflect the vote 64. If the set time period has expired, the vote processing software closes voting on the issue by disregarding the vote and ceasing to accept additional completed voting forms 62 for the issue. The vote processing software then retrieves the issue file 56 from the active issues database 26 and transfers the issue file 56 to the closed issue database 28.

In use, the submitter of the issue may also request that voting on the issue be referred to specified pre-formed panels of decision makers. The pre-formed panels may consist of professional arbitrators and mediators, and possibly judges and magistrates, selected and organized beforehand. In such cases, the issue submission software would recognize that the user has selected a pre-formed panel when processing the completed submission form 52 and notify panel members of the issue to be resolved. The panel members would have panel designations in their user profiles 48 to identify themselves as panel members and the issue file 56 would contain the panel designation of the selected panel. The vote processing software would recognize the panel designation when it queried the issue file 56 to determine voter qualifications 68 and match it with the panel designation in the panel member's user profile 48. Voting would be closed on the issue when all panel members had submitted a completed voting form 62.

Figure 5:
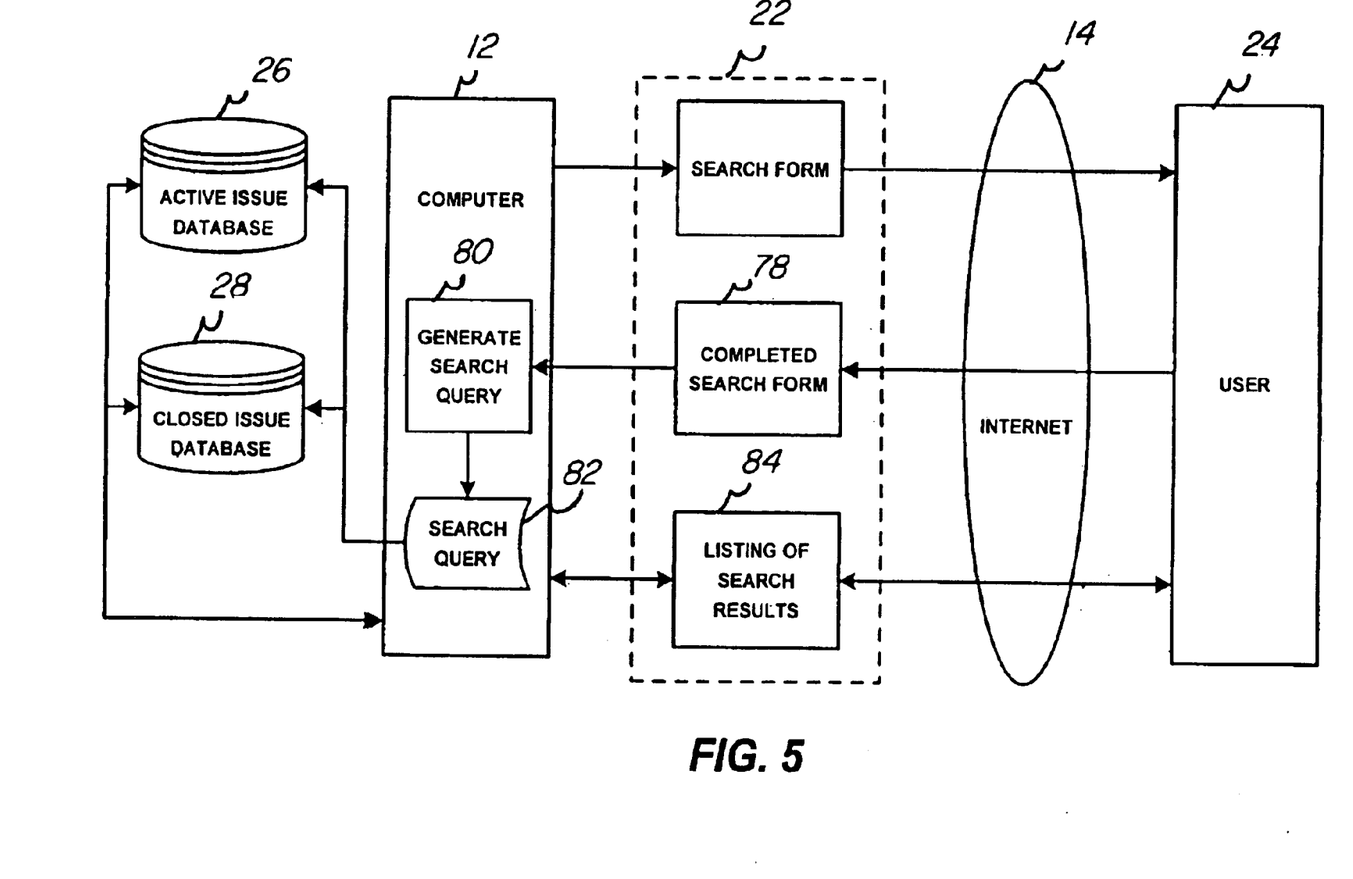
FIG. 5 is a schematic of the search process of the dispute resolution system of FIG. 1.

Preferably, the system 10 also includes search software executing on the computer, as shown in FIG. 5, that permits users to search the active issues database and the closed issues database for desired issues and to retrieve and view the issue files 56 therein. The search software transmits a search form 76 to the user 24 over the communications link. The search form 76 may have several formats. For example, the search form 76 may be a listing of grouped and classified issues or a request for a Boolean text search of databases selected by the user. The user 24 completes the search form 76 and submits the completed search form 78 to the computer 12 over the communications link.

Upon receipt of the completed search form 78, the search software processes the completed search form 78 and generates a search query 80. Using the search query 82, the search software accesses and scans the selected databases for the issues sought by the user and formulates a listing of search results 84 that is transmitted to the user over the communications link. The search results 84 correspond to issue files 56 located within the databases. The user 24 may then select and view any of the issue files 56 listed.

Figure 6:
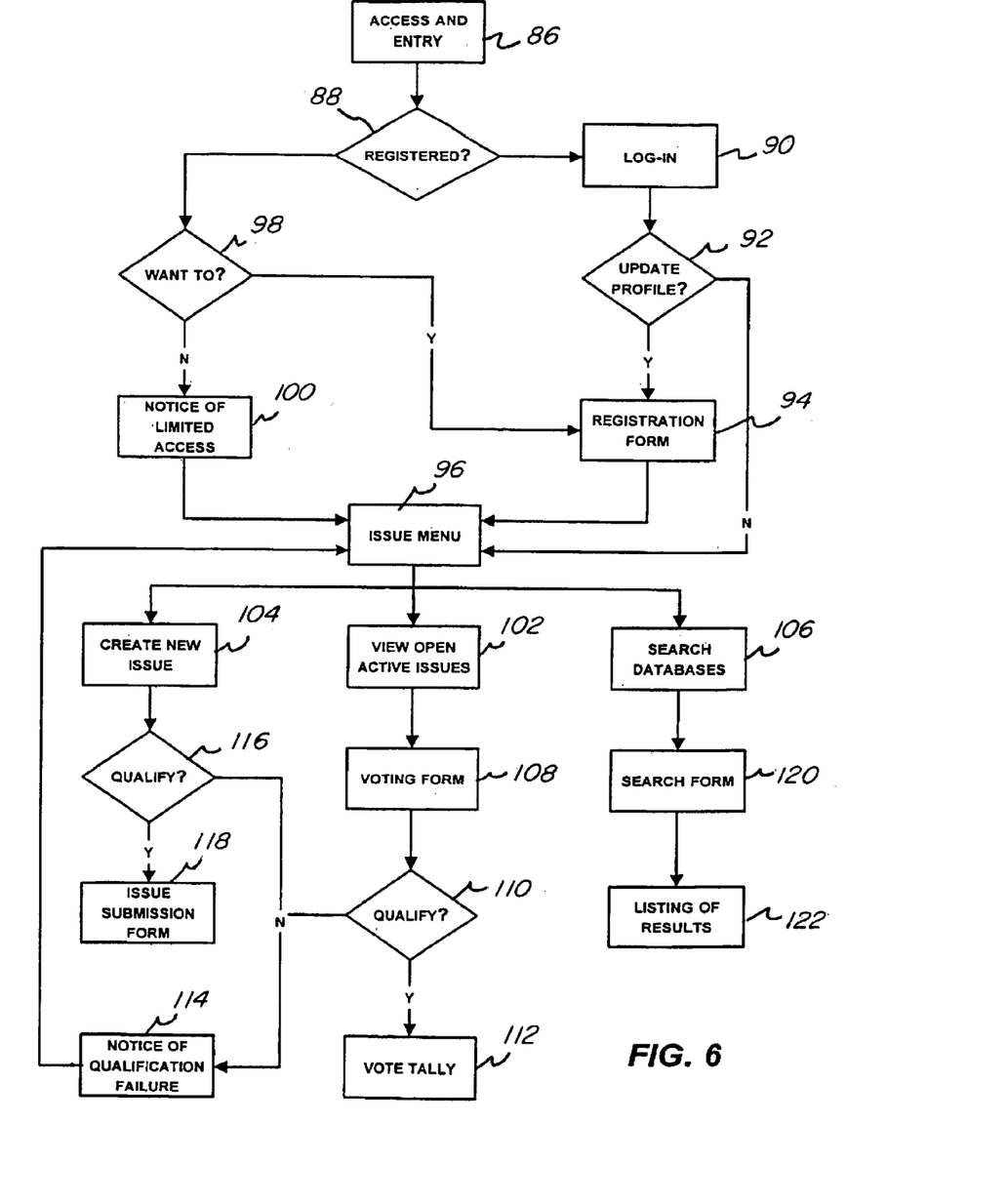
FIG. 6 is a flow chart of the system operation in accordance with a specific embodiment of the dispute resolution system.

FIG. 6 shows a flowchart illustrative of the operation of a specific embodiment of the system. Upon gaining entry and access 86 to the system, the user is asked whether the user is registered 88. If so, the user logs in using an, individualized access code 90. Upon submission of the access code, the user is asked to update registration information, if necessary 92. If such is necessary, the user is presented with a registration form 94 containing the user's current information for updating. Otherwise, the user is directed to an issue menu 96. If the user is not registered, the system asks if the user would like to register 98. If so, the user is presented with a registration form 94 for completion. Upon completion of the form, the user is directed to the issue menu 96. If the user does not register, the system informs the user that access will be limited to merely viewing issues therein 100.

The issue menu 96 presents the user with the option of viewing current active issues 102, creating a new issue 104, or searching the issue databases 106. Should the user choose to view current active issues 102, the system presents the user with a list of the current active issues. The user may then select the desired issue from the list and the system will present the issue along with the current results and a voting form 108. The user may then complete the voting form and submit it to the system. Upon receipt of the voting form, the system compares the users registration status with any requirements that might have been indicated by the submitter of the issue 110. If the requirements are satisfied, the system will process the vote and present the user with the updated vote tally 112. If the user is not registered or properly qualified, the system informs the user of such status 114 and returns the user to the issue menu 96.

If the user should choose the option of searching the issue databases 106 from the issue menu 96, the user will be presented with a search form 120 inquiring which key words or phrases the user is seeking and which databases are to be searched. The user then submits the completed form to the system. Upon successful processing of the form, the system will present the user with a listing of issues found 122 that satisfy the search request. If no matching issues are found, the user is informed of such. Otherwise, the user may select and view any issues from the provided list.

Although the invention has been described with reference to a particular arrangement of parts, features, and the like, these are not intended to exhaust all possible arrangements or features, and indeed many other modifications and variations will be ascertainable to those of skill in the art.

What is claimed is:

1. A system for performing dispute resolution comprising:
   a computer;
   a communications link between said computer and the Internet;
   an active issue database, accessible by said computer, containing a plurality of issue files and corresponding voting forms;
   issue presentation software executing on said computer for retrieving issue files and corresponding voting forms from said active issue database and presenting said issue files and corresponding voting forms to users over said communications link; and,
   vote processing software executing on said computer for receiving completed voting forms submitted by users over said communications link, updating said issue files in said active issue database to reflect said completed voting forms, and presenting vote tallies to users over said communications link, and
   said issue files contain voting qualifications and said vote processing software further performs the functions of retrieving said voting qualifications from said issue files in said active issue database, retrieving user profiles corresponding to users in said users database, comparing said voting qualifications against said user profiles, transmitting qualification failure notices to unqualified users over said communications link, and disregarding completed voting forms from unqualified users.

2. The system of claim 1 further comprising issue submission software executing on said computer for receiving issue submission requests from users over said communications link, transmitting issue submission forms to users over said communications link, receiving completed issue submission forms from users over said communications link, generating issue files based on said completed issue submission forms, and storing said issue files in said active issue database.

3. The system of claim 1 further comprising a users database, accessible by said computer, containing a plurality of user profiles.

4. The system of claim 3 further comprising registration software executing on said computer for determining whether users are registered, transmitting log-in forms to registered users over said communications link, receiving completed log-in forms from registered users over said communications link, transmitting registration forms to unregistered users over said communications link, receiving completed registration forms from unregistered users over said communications link, generating user profiles based on said completed registration forms, and storing said user profiles in said users database.

5. The system of claim 1 further comprising a closed issue database, accessible by said computer, containing a plurality of issue files.

6. The system of claim 5 wherein said issue files contain time periods for voting and said vote processing software further performs the functions of querying said issue files in said active issues database to determine said time periods for voting, ceasing to accept completed voting forms from users at the expiration of said time periods, and transferring said issue files from said active issue database to said closed issue database.

7. The system of claim 6 further comprising search software executing on said computer for presenting users with search forms over said communications link, receiving completed search forms submitted by users over said communications link, generating search queries based on said completed search forms, querying the active issue database and the closed issue database using said search queries, collecting listings of search results, and presenting said listings of search results to users over said communications link.

8. The system of claim 1 further comprising software executing on said computer for operating and maintaining and Internet website for enabling communication between users and the computer.

9. A method for performing dispute resolution comprising the steps of:
providing a computer;
providing a communications link between said computer and the Internet;
providing an active issue database, accessible by said computer, containing a plurality of issue files and corresponding voting forms;
authenticating users;
receiving and processing issues submitted by users over the communications link;
transmitting issue files and corresponding voting forms to users over said communications link;
receiving completed voting forms submitted by users over said communications link;
verifying voting qualifications, comprising;
retrieving voting qualifications from said issue files in said active issue database;
retrieving user profiles corresponding to users in said users database;
comparing said voting qualifications against said user profiles;
transmitting qualification failure notices to unqualified users, and,
disregarding completed voting forms submitted by unqualified users processing said completed voting forms;
presenting vote tallies to users over said communications link.

10. The method of claim 9 wherein said step of authenticating a user further comprises the steps of:
providing a users database, accessible by said computer, containing a plurality of user profiles,
determining whether users are registered;
presenting registered users with log-in forms;
receiving completed log-in forms from registered users;
presenting unregistered users with registration forms;
receiving completed registration forms from unregistered user;
generating user profiles based on said completed registration form, and
storing said user profiles in said users database.

11. The method of claim 9 wherein the step of receiving and processing issues further comprises the steps of:
receiving issue submission requests from users over the communications link;
transmitting issue submission forms to users over said communications link;
receiving a completed issue submission form from users over said communications link;
generating issue files based on said completed issue submission forms; and,
storing said issue files in said active issue database.

12. The method of claim 10 wherein the step of processing said completed voting forms further comprises the steps of:
providing a closed issue database, accessible by said computer containing a plurality of issue files,
querying issue files in said active issues database to determine time limits on voting,
ceasing to accept voting forms at the expiration of said user-defined time limit, and,
transferring said issue file from the active issue database to the closed issue database.

13. A method for performing dispute resolution comprising the steps of:
providing a computer;
providing a communications link between said computer and the Internet;
providing an active issues database, accessible by said computer,
containing a plurality of issue files and corresponding voting forms;
providing an interactive Internet website to enable communication between said computer and users;
transmitting issue submission forms to users electronically over the Internet;
receiving completed issue submission forms from users electronically over the Internet;
generating issue files based on said completed issue submission forms;
storing said issue files in said active issue database;
transmitting said issue files and voting forms to users electronically over the i Internet;

receiving completed voting forms from users electronically over the Internet;

providing an users database, accessible by said computer, containing a plurality of user profiles:

retrieving voting qualifications from said issue files in said active issues database;

retrieving user profiles corresponding to users in said users database;

comparing said voting qualifications against said users profiles;

disregarding completed voting forms from unqualified users;

updating said issue files in said active issues database based on voting forms submitted by qualified users; and transmitting vote tallies to users electronically over the Internet.

14. The method of claim 13 wherein the step of updating said issue files further comprises the steps of:

querying said issue files in the active issue database to determine a time period;

ceasing to accept completed voting forms at the expiration of said time period; and, transferring said issue files to a closed issue database.

* * * * *